3,345,320
REMOISTENABLE HOT-MELT ADHESIVES CONTAINING PLASTICIZED COPOLYMERS OF N-VINYL LACTAMS
Melville W. Uffner, Easton, Pa., and Paul Weitz, Scotch Plains, N.J., assignors to General Aniline & Film Corporation, New York, N.Y., a corporation of Delaware
No Drawing. Filed May 25, 1964, Ser. No. 370,045
5 Claims. (Cl. 260—31.6)

This invention relates to new and useful compositions of matter and more specifically to coating and adhesive compositions of matter which may be employed as remoistenable hot-melt adhesives.

A hot-melt adhesive is a bonding agent which achieves a solid state and resultant cohesive strength by cooling where other types of adhesives achieve the solid state through evaporation or removal of solvents, as well as by polymerization. At room temperature, a hot-melt adhesive is a thermoplastic, nonvolatile solid material. When the hot-melt adhesive is heated, it liquifies and after removal of heat, it solidifies on cooling. When a liquified hot-melt adhesive is brought into close contact with the surfaces to be bonded, a molecular layer of the surface of each substrate immediately attains a temperature approximating that of the molten adhesive and a high degree of wetting, almost coalescence, of the molten adhesive with the surfaces of the materials to be bonded occurs. Immediately after contact, the molten adhesive loses heat to the surfaces of the substrates and a temperature equilibrium is attained. Since the adhesive is in contact with a mass much larger than itself, the temperature of the entire system will drop to a point where the adhesive sets to a solid having adequate cohesive strength to hold the substrates together. Hot-melt adhesives are usually used for reasons such as process speed, streamlining of process equipment by elimination of driers and other auxiliary equipment or the like. Where higher performance (such as greater strength and durability under more extreme conditions) is required, other types of adhesives such as solvent cements, emulsion adhesives or thermosetting adhesives are used. Generally, hot-melt adhesives are used because of the speed with which they produce bonds and because they do not require flash-off of volatiles prior to making bond. Hot-melt adhesives eliminate the expense of solvents, but greater cost reductions result from the time saved in application of the adhesive. Although a hot-melt adhesive is usually applied to one substrate which is then bonded to a second substrate immediately after application of the molten adhesive, it can be used to make bond by another technique. Thus it can be applied to one substrate, and the coated substrate can be cooled and stored and later reactivated by heat sealing or by solvent.

A water remoistenable adhesive is a dried film of adhesive material which can be activated by moistening with water. It is called remoistenable because the adhesive mass is initially in the form of a wet film from which water is vaporized to produce a dried film which can then be reactivated by moistening with water. Usually, an aqueous form of the adhesive is spread as a wet film on a backing (the substrate), e.g., paper, by means of applicator rolls and then thoroughly dried by passing the coated backing through a heated chamber. When this dried adhesive film is remoistened with water, the adhesive film reverts almost instantaneously to its former gummy or tacky wetstate and permits the backing coated with the adhesive to be affixed with a degree of permanence to another surface. Examples of such water remoistenable adhesives include gummings used on labels, sealing tapes and flaps of envelopes. Materials used in the compounding of remoistenable adhesives are of necessity water soluble or water dispersible and are often dispersed in water to produce aqueous systems having dried solids content ranging from 45 to 70%.

An adhesive coating on the substrate must be a liquid at some point when it is in contact with the material to which the coated substrate is to be bonded. In order for a dried adhesive coating to bond to a substrate the adhesive must be in the mobile state. Mobility (liquefaction) of the adhesive coating may occur in one of the following ways:

(1) If the adhesive is pressure sensitive, the adhesive will undergo cold flow when pressure is applied, i.e., the adhesive mass flows under pressure and is in effect in mobile (liquid) form.

(2) If the adhesive coating is water remoistenable, moistening the coating with water will form an aqueous adhesive system which flows.

(3) If the adhesive is a heat sealing adhesive, the adhesive coating will liquify and flow when heat is applied to the coating.

(4) If the adhesive can be activated with a solvent, then the application of solvent will result in a mobile adhesive (a solvent adhesive system which flows when solvent is applied to the coating).

Under certain conditions where rapid drying of the glue line is desired, solvents other than water may be used to activate the adhesive coating; or volatile water soluble solvents may be added to the water used in the activation of the adhesive coating to accelerate the drying rate.

It is an object of the present invention to provide remoistenable hot melt adhesive compositions. Another object is to provide a method for the production of remoistenable hot melt adhesive compositions. Other objects and advantages of the present invention will appear as this description proceeds.

The attainment of the objects of this invention is made possible by the discovery that compositions of N-vinyl lactam copolymers, containing as dissimilar vinyl monomers comonomers such as vinyl acetate, and a plasticizer or "fluxing" agent whose function is to lower the melt temperature (the softening point) of the composition are useful as remoistenable hot-melt adhesives. If desired, antioxidants such as styrenated phenol and/or anti-blocking agents such as polyethylene or hydroxystearin may be added to these compositions. Other additives such as inert pigments, fillers, dyes or the like normally used as modifiers which do not effect the essential working properties or performance characteristics of the adhesive compositions may also be added. It is to be understood that other polymers, copolymers, resins or the like may be used as diluent in these compositions. It was completely unexpected that these N-vinyl lactam copolymer compositions would have such new and novel properties, that they would be useful as remoistenable hot melt adhesive compositions in view of the teachings of the prior art that hot-melt adhesives are thermoplastic, nonvolatile compositions which are to be applied to the surfaces to be bonded in the form of hot liquids and develop their bond strength on cooling, whereas remoistenable adhesives are either aqueous solutions or solvent dispersions of adhesives which are applied in these forms to one of the surfaces to be bonded, dried to form a coating on that surface, activated by moistening the dried coating, which then causes it to revert to its former gummy or tacky state so that it will adhere to another surface when the surface having the gummy or tacky coating is affixed to the other surface to be bonded. The remoistenable hot melt, on the other hand, provides a means of applying a remoistenable adhesive by hot-melt technique (as a 100% solids system).

As an added advantage which demonstrates the versatility of the adhesive compositions of this invention, these compositions can be activated also by solvents other than water, such as ketones, esters, alcohols or the like. It is an advantage if an adhesive deposited from a hot melt system can be activated by water, other solvents, or water solvent combinations. For example, if the adhesive is to be applied to a plastic film, difficulties arise if an aqueous based adhesive is used because the vehicle (water) does not penetrate the film and must be removed by evaporation. The advantage of a hot melt adhesive in such an application is obvious. The hot melt adhesive sets (solidifies) on cooling rather than by evaporation of the vehicle. If the plastic film is to be sealed to a material such as a fibrous surface, e.g., a permeable surface such as paper, cloth or the like, then water is a convenient activating solvent. On the other hand, if the plastic film is to be bonded with another plastic film or nonpermeable surface such as aluminum foil, then an activating solvent such as water will be trapped or retained in the bond whereas an organic activating solvent such as a ketone or ester usually permeates the plastic substrate more readily.

The uniqueness of these remoistenable hot-melt compositions is that they can be used to make bond by hot-melt technique; or they can be coated on a substrate by hot-melt technique; the coated substrate can then be cooled and stored until ready for bonding to another adherend at which time the coating can be activated with either water or a suitable organic solvent, or by heat sealing.

Copolymers of N-vinyl lactam and dissimilar vinyl monomers are highly suitable for use in remoistenable hot-melt adhesive compositions. Other known polymers which have suitable thermoplastic properties lack the capacity to develop strong adhesive tack in the presence of moisture while those polymers which develop adhesive tack in the presence of moisture tend to decompose on heating and are unsuitable for use in hot-melt adhesive compositions. Copolymers of N-vinyl lactam and dissimilar vinyl monomers have the advantage that they are sensitive to moisture and develop adhesive tack on remoistening. Furthermore, they also have the advantage that the melt viscosity of compositions in which they are used can be lowered to practical working limits (by the addition of water soluble plasticizers or "fluxing" agents such as triacetin) without loss of remoistening sensitivity.

Polymers presently being used in hot melt formulations do not develop tack on remoistening with water. These polymers include resins such as coumarone-indene resins, rosin and its derivatives, mineral, vegetable and petroleum waxes, alkyds, terpene resins, heat stable aldol resins, ketone resins, ethyl cellulose, polyvinyl acetate and its copolymers, containing vinyl acrylate or vinyl chloride, polyethylene, polystyrene and styrene copolymers, polyamides, polyisobutylene or the like.

Polymers presently being used as remoistenable adhesives, but which cannot be applied as hot melt adhesives because they decompose on heating, include dextrins, starches, polyvinyl alcohols, animal and fish glues, polycarboxylic acids, vegetable gums, cellulose gums, lignosulfonates or the like.

Polyvinylpyrrolidone has the property of developing tack on remoistening with water, but its polymers have such high melting points that decomposition occurs on melting whereas copolymers of N-vinyl lactams with dissimilar vinyl monomers have the advantage that they do not tend to decompose on melting. These copolymers are suitable for use as hot-melt adhesives and have the added advantages that they can be activated for adhesive use not only by heat sealing, but also by remoistening with water or by a suitable organic solvent. These N-vinyl lactam copolymers can also be blended with related copolymers having different ratios of N-vinyl lactam and the dissimilar vinyl monomer to lower flow point temperatures and to increase blocking of resistance of hot-melt adhesive compositions. In these mixtures, the greater the proportion of the copolymer having the lower proportion of dissimilar vinyl monomer used at comparable plasticizer levels, the longer the open assembly time and the faster the time to set after remoistening. Open assembly time is the period of time during which the remoistened adhesive is exposed to the atmosphere and is still capable of making a bond to paper. Time to set is the time in which the remoistened adhesive makes a fiber tearing bond to the paper.

An advantage of the remoistenable hot-melt compositions disclosed by this invention is that they may be applied more rapidly than customary water-borne remoistenable adhesives, thus permitting faster production coating rates. In addition, they have the advantage that they may be heat sealed as well as remoistened.

Briefly, one process for preparing copolymers of N-vinyl lactams with dissimilar nonaqueous vinyl monomers for use in this invention involves reaction of the two dissimilar monomers under polymerization conditions in the presence of a free-radical supplying polymerization catalyst.

N-vinyl lactam monomers useful in the preparation of these copolymers may be characterized by the general Formula I:

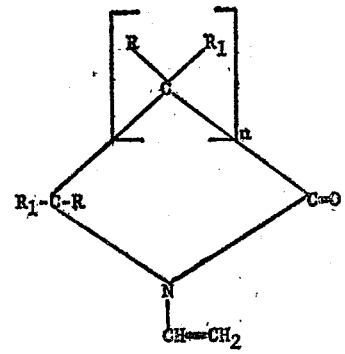

wherein R is hydrogen, methyl or ethyl, $R_1$ is hydrogen, methyl or ethyl and $n$ is an integer of from 2 to 4. A suitable method for preparing these monomers is disclosed in U.S. Patent 2,317,804. N-vinyl lactams which may be used in preparing copolymers for use in this invention include the N-vinyl derivatives of gamma, delta, epsilon lactams (N-vinyl derivatives of the cyclic amides of gamma, delta, and epsilon amino carboxylic acids of the aliphatic series) and the lower alkyl (methyl or ethyl) substituted derivatives of such lactams. Among this group, N-vinyl-2-pyrrolidone (otherwise referred to as 1-vinyl-2-pyrrolidone or N-vinyl-α-pyrrolidone) is a preferred monomer. As further examples of N-vinyl lactams operative herein, and which may be prepared in known manner by N-vinylation of the corresponding lactams at elevated temperatures in the manner disclosed in U.S. Patent 2,317,804, there may be mentioned the N-vinyl substituted derivatives of the following lactams: 3,3-dimethyl-2-pyrrolidone, 4,4-dimethyl-2-pyrrolidone, 5,5-dimethyl-2-pyrrolidone, 3-ethyl-2-pyrrolidone, 4-ethyl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone, 3,5,5 - trimethyl - 2 - pyrrolidone, 4,5,5-trimethyl-2-pyrrolidone, 2-piperidone, 5,5-diethyl-2-piperidone, 5,6-dimethyl-2-piperidone, 4-ethyl-2-piperidone, 6- ethyl-2-piperidone, 5-ethyl-6-methyl-2-piperidone, 6-ethyl-3-methyl-2-piperidone, 3-methyl-2-piperidone, 4-methyl-2-piperidone, 5-methyl-2-piperidone, 6-methyl-2-piperidone, 2-caprolactam, 3,6-dimethyl-2-caprolactam, 4,6-dimethyl-2-caprolactam, 4,7-dimethyl-2-caprolactam, 7,7-diethyl-2-caprolactam, 3-ethyl-2-caprolactam, 5-ethyl-2-caprolactam, 6-ethyl-2-caprolactam, 7-ethyl-2-caprolactam, 4-ethyl-6-methyl-2-caprolactam, 6-ethyl-4-methyl-2-caprolactam, 3-methyl-2-caprolactam, 4-methyl-2-caprolactam, 5-methyl-2-caprolactam, 6-methyl-2-caprolactam or the like.

Nonaqueous vinyl monomers which may be used in the preparation of these copolymers of N-vinyl lactams include: vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, dodecyl vinyl ether, octadecyl vinyl ether, phenyl vinyl ether, 2-oxyethyl vinyl ether, methyl acrylate, ethyl acrylate, 2-ethylhexyl acrylate, hexyl acrylate, dodecyl acrylate, octadecyl acrylate, styrene, 2-methoxystyrene, 2-methylstyrene, 2-chlorostyrene, 2-ethylstyrene, their isomers, their mixtures or the like.

Molecular weights of copolymers of N-vinyl lactams and dissimilar nonaqueous vinyl monomers useful in this invention generally range from about 50,000 to 150,000 or higher. The molecular weight of the N-vinyl lactam copolymer will depend on the degree of polymerization. Frequently, the degree of polymerization and relative molecular weights of these polymers are expressed in terms of Fikentscher K values. A method of determining Fikentscher K values is given in Modern Plastics, 23, No. 3, 157–61, 212, 214, 216, 218 (1945). The weight ratio of N-vinyl lactam to vinyl monomer which is used in preparing these copolymers is optional depending on the desired properties; but usually ranges from about 90:10 to 10:90. As pointed out above, mixtures of copolymers having different weight ratios of N-vinyl lactam to vinyl monomer may be used to lower flow point temperatures, to increase blocking resistance, and to adjust the remoistening sensitivity of the remoistenable hot melt adhesives disclosed by this invention.

Plasticizers or "fluxing" agents which may be employed in the manufacture of remoistenable hot melt compositions disclosed by this invention includes benzoates, glycollates, phthalates, sulfonamides, stearic acid, or the like. Among the preferred plasticizers are those which are water soluble or water dispersible such as triacetin and polyols, e.g., glycerol, sorbitol and polyethylene glycols, as well as, polyethylene glycol stearates, diglycol stearates, glycerides of stearic acid and hydroxystearic acid, or the like. Polyethylene glycols having softening points of about 60° C. or above and polyethoxylated nonylphenols and dinonylphenols having softening points in this range are particularly useful.

Antioxidants which may be employed in remoistenable hot melt compositions disclosed by this invention include phenolics, amines, and quinones or the like.

Remoistenable hot-melt compositions having from 50 to 100 parts of N-vinyl lactam copolymers and from 5 to 200 parts of plasticizer or "fluxing" agents may be employed in the practice of this invention. From 1 to 2 parts of antioxidant may be added if desired. Antiblocking agents may be added if required. Generally, from 50 to 100 parts of copolymer and from 5 to 50 parts of plasticizer are used in these compositions. It is to be understood that combinations of 2 or more copolymers, plasticizers or "fluxing" agents, antiblocking agents, or antioxidants may be employed in these compositions. Normally these compositions are prepared by one of the following techniques:

(a) An N-vinyl lactam emulsion is charged to a mixing tank equipped with a propeller blade stirrer. The emulsion is agitated vigorously and the other components of the composition are added in solution or emulsified form. Usually the plasticizer or "fluxing" agent is added slowly in liquid or melted form or as a solution in a suitable organic solvent; antiblocking agents are added in a similar manner; and then the liquid or emulsified antioxidant is added. Stirring is continued until the composition is homogeneous. Water is then removed from the composition by vaporization. Vaporization methods which may be employed include spray drying, vacuum drying, spreading the composition on a moving belt and passing the belt through a heated tunnel to flash off the volatiles. The composition on cooling is a dry mass, usually a powder or a slab which can be mechanically shredded for convenient metering to a hot melt pot. The dried material may then be packaged or used directly.

(b) A dry N-vinyl lactam copolymer is charged to a sigma-blade heavy duty mixer which can be heated by means of a steam or oil jacket. The N-vinyl lactam copolymer is heated to just below its softening point and kneaded into a doughy mass. Plasticizer or "fluxing" agent, antiblocking agent and antioxidant are slowly added to the doughy mass during mixing. These components are added in their anhydrous form either as solids or liquids. The components are kneaded under high shear until the composition is homogeneous. When mixing is complete, the temperature of the composition is raised until the mixture is fluid enough to be discharged into a storage container. If desired, the hot melt can be extruded in rope form or pelletized, cooled and then stored.

(c) A dry N-vinyl lactam copolymer, plasticizer or "fluxing" agent, antiblocking agent, and antioxidant and suitable solvent are charged to a drum and the charge is rolled until a homogeneous colloidal solution is obtained. The contents can then be dried as in (a).

Remoistenable hot-melt adhesives prepared by the above methods may be applied (coated) to any substrate by known industrial methods. An important requirement for the application of hot-melt adhesives is that all machine parts (including reservoir, application and metering rollers or blades) should be heated to prevent the premature cooling or setting of the adhesive. Thus, conventional coating methods known in the art as direct roll coaters, reverse roll coaters, stencil or pattern transfer coaters, coaters utilizing printing techniques such as rotogravure or flexographic, knife or blade coaters, and extruders may be used for the application of hot melts provided that the aforesaid machine parts are adapted to provide uniform heating of the hot melt while in the reservoir and during its application.

The examples shown in Table I are preferred embodiments of the present invention. These examples are only illustrative of the present invention and are not to be regarded as limitative. It is to be understood that all parts, percentages and proportions referred to herein and in the appended claims are by weight unless otherwise indicated.

In these examples several different N-vinyl lactam copolymers are employed. Copolymer A is a copolymer having an N-vinyl-2-pyrrolidone to vinyl acetate weight ratio of 25:75 and a K value of 50.8; Copolymer B is a copolymer having an N-vinyl-2-pyrrolidone to vinyl acetate weight ratio of 45:55 and a K value of 54.5; Copolymer C is a copolymer having an N-vinyl-2-pyrrolidone to vinyl acetate weight ratio of 60:40 and a K value of 52; and Copolymer D is a copolymer having an N-vinyl-2-pyrrolidone to vinyl acetate weight ratio of 10:90 and a K value of 55.

The plasticizers or "fluxing" agents used in these examples include triacetin, glycerol and polyethylene glycol. The polyethylene glycol employed in these examples has an average molecular weight of 1000. The antioxidant employed is a styrenated phenol. Polyvinyl acetate is employed in Example 7 as an antiblocking agent.

Techniques (a), (b) and (c) are employed in the preparation of the compositions shown in Examples 1–8 (inclusive). All three techniques give comparable compositions. These compositions are applied in molten form to paper by using heated rod or bar applicators which have means for metering controlled film thicknesses. Films of 1 to 3 mils are applied.

TABLE I.—REMOISTENABLE HOT MELT ADHESIVE COMPOSITIONS

| | Example No. | | | | | | | |
|---|---|---|---|---|---|---|---|---|
| | 1 | 2 | 3 | 4 | 5 | 6 | 7 | 8 |
| Components (as parts dry weight): | | | | | | | | |
| Copolymer A | | | 42 | 28 | 30 | | | |
| Copolymer B | 77 | 77 | 42 | 55 | 60 | 42 | 55 | |
| Copolymer C | | | | | | | | 71 |
| Copolymer D | | | | 42 | | 42 | | |
| Polyvinyl Acetate | | | | | | | 28 | |
| Triacetin | 23 | | | | | | 17 | |
| Glycerol | | 23 | 16 | 17 | | 16 | | |
| Polyethyleneglycol | | | | | 10 | | | 29 |
| Antioxidant | 1 | 1 | 1 | 1 | 1 | 1 | 1 | |
| Properties: | | | | | | | | |
| Flow Point °C | 85 | 100 | 75 | 107 | 100 | 80 | 96 | 105 |
| Blocking Temperature, °C., at 35% Relative Humidity | 60 | 51 | 70 | 80 | 96 | 60 | 60 | 42 |
| Degree of Blocking under 2 p.s.i. load at 23° C. and 50% Relative Humidity for 72 hours | Slight | Slight | None | None | None | None | Slight | Slight. |
| Remoistenability: | | | | | | | | |
| Time to leg, min | <0.2 | <0.2 | 0.4 | <0.2 | <0.2 | 0.4 | <0.2 | <0.2 |
| Time to set, min | 0.2 | 3.0 | 2.3 | 1.5 | 0.5 | 10 | 1-2 | 1-2 |
| Open Assembly Time, sec | 42+ | 36 | 18 | 36 | 24 | 18 | 24 | 42+ |

Definitions of the various properties measured in these examples are as follows:

*Flow point.*—That temperature at which the composition begins to flow.

*Blocking temperature, °C, at 35% relative humidity.*—The lowest temperature at which the adhesive coat will adhere to untreated kraft. The test was run as prescribed in TAPPI Method T642 sm–60.

*Degree of blocking.*—At constant temperature, relative humidity, load and time, the degree of adhesion of the remoistenable hot melt to untreated kraft.

*Time to leg.*—Upon remoistening the adhesive layer and then applying untreated kraft to the remoistened adhesive, the time for the bond to begin to develop as evidenced by stringing of the adhesive as the components of the laminate are separated.

*Time to set.*—The time in which the remoistened adhesive makes a fiber tearing bond to kraft.

*Open assembly time.*—The period of time during which the remoistened adhesive is exposed to the atmosphere and is still capable of making bond to kraft.

*Glue line.*—The area comprising the adhesive layer and the interface between the adhesive and adherends (substrates).

*Antiblocking agent.*—A chemical material which is added to an adhesive formula to prevent the adhesive coating made therefrom from adhering to its backing, when the adhesive coated substrate is rolled or stacked, at ambient room temperatures and relative humidities. Blocking can be caused by moisture or heat, either of which may activate latent tack properties of the adhesive composition.

Adhesive compositions disclosed in this invention may also be employed as remoistenable hot melt adhesives for bonding plastic substrates such as polyesters, cellulosics or the like to paper as well as to other solvent permeable substrates. Likewise, metal substrates such as aluminum foil, copper foil or the like may be bonded to moisture or solvent permeable surfaces.

This invention has been disclosed with respect to certain preferred embodiments. Various modifications and variations thereof will become obvious to persons skilled in the art. It is to be understood that such modifications and variations are to be included within the spirit and scope of this invention.

What is claimed is:

1. A remoistenable hot-melt adhesive consisting essentially of (A) from 50 to 100 parts of a copolymer of an N-vinyl lactam of the formula:

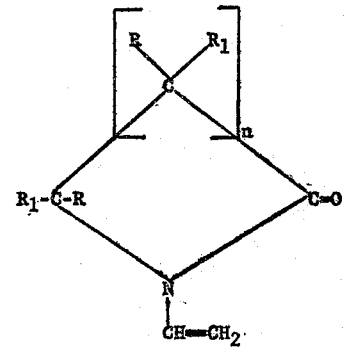

wherein R is a member selected from the group consisting of hydrogen, methyl and ethyl, $R_1$ is a member selected from the group consisting of hydrogen, methyl and ethyl, and $n$ is an integer of from 2 to 4 and the copolymer is prepared by reacting (i) 90 to 10% by weight of N-vinyl lactam with (ii) 10 to 90% by weight of a nonaqueous vinyl monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene and chlorostyrene under polymerization conditions in the presence of a free radical supplying polymerization catalyst, and (B) from 5 to 50 parts of a plasticizer (fluxing agent) selected from the group consisting of triacetin and polyols.

2. A composition as defined in claim 1 wherein a copolymer of N-vinyl-2-pyrrolidone and vinyl acetate is employed.

3. A composition as defined in claim 1 wherein the plasticizer is triacetin.

4. A composition as defined in claim 1 wherein the plasticizer is glycerol.

5. A composition as defined in claim 1 wherein the plasticizer is polyethylene glycol.

References Cited

UNITED STATES PATENTS

| 2,667,473 | 1/1954 | Morner et al. | 260—85.7 |
| 2,941,980 | 6/1960 | Robinson | 260—85.7 |
| 2,958,614 | 11/1960 | Perry | 260—33.4 |
| 3,096,202 | 7/1963 | Arx | 260—33.4 |
| 3,153,640 | 10/1964 | Barnum et al. | |
| 3,158,589 | 11/1964 | Glickman et al. | 260—30.8 |
| 3,166,525 | 1/1965 | Perry | 260—85.7 |

OTHER REFERENCES

Skeist: Handbook of Adhesives, Reinhold Publishing Corp., 1962; pp. 449–450.

MORRIS LIEBMAN, *Primary Examiner.*

JULIUS FROME, *Examiner.*

L. T. JACOBS, *Assistant Examiner.*